Aug. 22, 1967      H. SOMMERMEYER      3,337,053
MAGNETIC FILTER
Filed Feb. 27, 1964
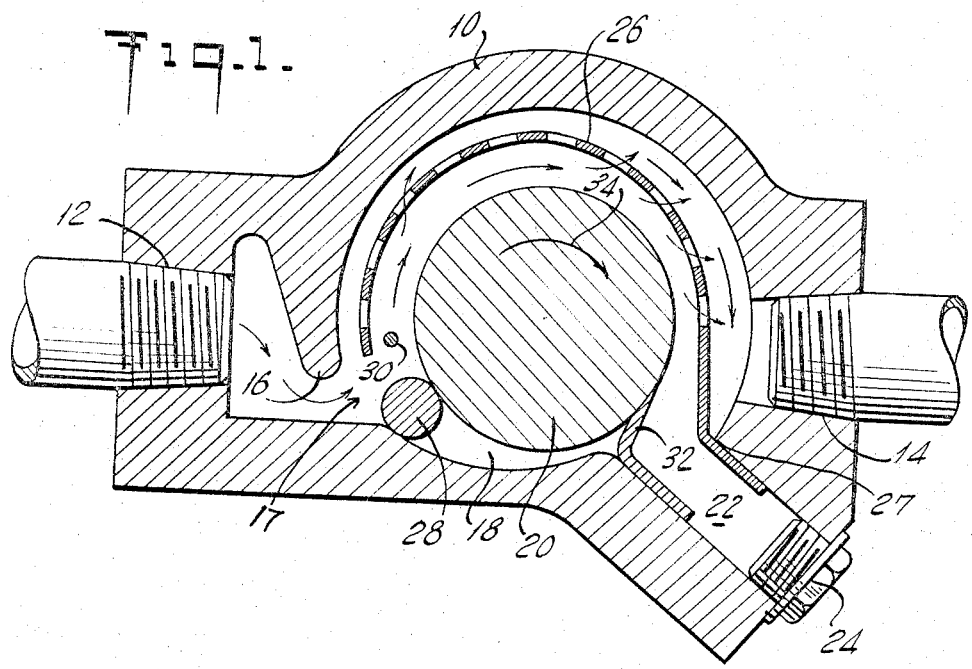
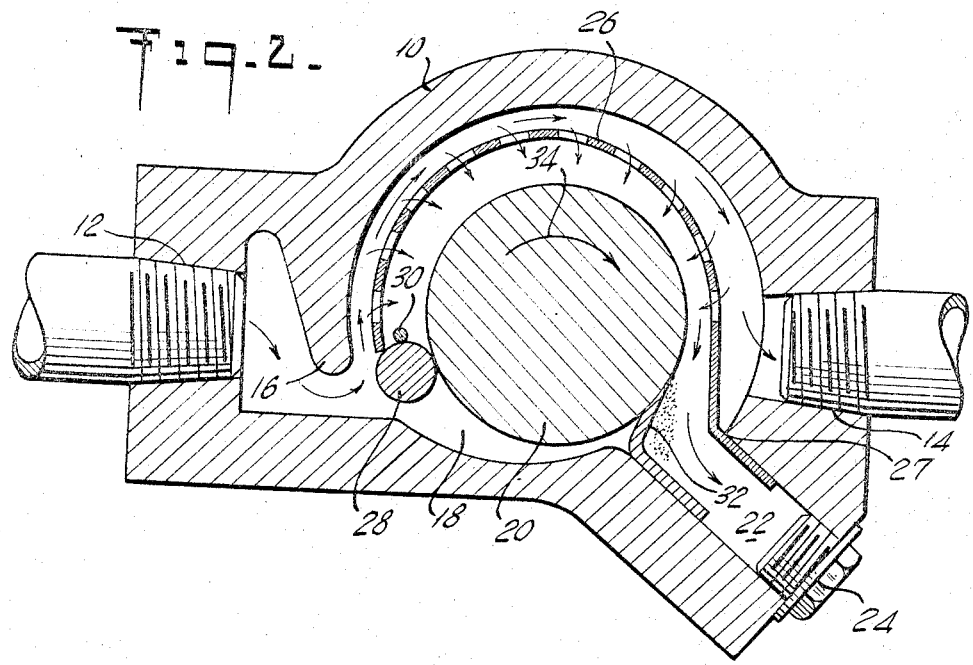
INVENTOR.
HEINRICH SOMMERMEYER United States Patent Office 3,337,053
Patented Aug. 22, 1967

3,337,053
MAGNETIC FILTER
Heinrich Sommermeyer, Ronneburger Strasse 13,
Gera, Thuringia, Germany
Filed Feb. 27, 1964, Ser. No. 348,902
4 Claims. (Cl. 210—223)

This invention relates to fluid filters, and in particular to a continuous filter having both magnetic and mechanical means to filter a fluid stream together with means for cleaning the respective filters.

Continuously operating filters are known in which the supply and discharge apertures are disposed opposite each other, and in which both magnetic and mechanical filtering means are included within the working area of the filter. Since the respective filters become clogged or soiled during operation, various methods have been proposed to clean the filters in as simple a fashion as possible without interrupting operation of the filter. Heretofore, the cleaning of such filters during the period of operation has necessitated design compromises seriously reducing the separating effect of the filter. Thus, the main object of the present invention is to provide a continuously operating filter wherein means are provided to clean the filter during its period of operation.

A more specific object of the invention is to provide a continuously operating combination magnetic and mechanical filter having opposed supply and discharge apertures capable of removing impurities from a fluid stream with a high degree of efficiency, and including means for cleansing both the magnetic and mechanical filtering devices during operation.

Another object is to provide a combination magnetic and mechanical filter with increased separating capacity.

The above objects are accomplished by the use of a rotatable cylindrical magnet positioned within the filter housing in such a manner that the inlet and outlet apertures are located substantially beneath the center of the magnet. A mechanical filter extends from the bottom portion of the discharge aperture concentrically around the cylindrical magnet to the upper portion of the supply aperture, the mechanical filter being spaced between the magnet and the housing wall. A wiper element is provided so that when the magnet is rotated the magnetic particles adhering thereto are removed to a separate sludge chamber. The mechanical filter is cleaned by the use of a blocking valve which forces the fluid in a reverse direction through the filter to flush the impurities therein into the sludge chamber from which they may be removed, when desired, through a conventional valve. The device operates in such a manner that in addition to the mechanical and magnetic separating effects, there is also a flotation effect to improve the separation.

The manner in which the above objects are accomplished will be explained in greater detail below with reference to the following drawings, wherein:

FIGURE 1 is a cross sectional view of the filter in its normal operating position; and FIGURE 2 is a cross sectional view of the filter of FIGURE 1 in its cleaning position.

With reference to FIGURES 1 and 2, the filter of the invention comprises a housing 10 having horizontal inlet and outlet ducts, 12 and 14, respectively, disposed at opposite ends of the filter. On the inlet side, an integral deflecting member 16 extends downwardly across the width of the filter to provide a supply aperture 17 at the bottom of the filter. As illustrated, the working area of the filter within housing 10 is of a generally cylindrical configuration, including an eccentric concave portion 18 at the bottom of the housing.

A cylindrical magnet 20 is journalled in the near and far ends of the housing 10 by means (not shown) toward the bottom of the filter working area. One of the journalling means further includes an exterior handle (not shown) enabling manual rotation of the magnet. Since the means by which the magnet may be rotatably supported within the ends of the housing may be conventional, they are not illustrated nor described in further detail herein.

A sludge chamber 22 extends obliquely downwardly at the bottom of the working area of the filter and is terminated in a quick opening valve 24, which, as will become more apparent below, enables the removal of impurities separated from the fluid stream passing through the filter. A semi-cylindrical mechanical filter 26, which may be of a known construction, is secured at one end in a suitable manner to the upper wall of sludge chamber 22 so that it extends from an inwardly projecting rim 27 immediately beneath the discharge aperture 14 of the filter. The free end of the mechanical filter 26 terminates adjacent the lower end of deflecting element 16 slightly above supply aperture 17.

A cylindrical valve member 28 is seated in concave portion 18 toward the supply aperture 17 in an abutting relationship with magnet 20. Valve member 28 is made of a magnetic material and may be solid or in the form of a pipe so that it is capable of rotating upwardly when magnet 20 is manually rotated to abut against a pair of stop pins 30 extending laterally from opposite ends of housing 10. Stop pins 30 are so placed with respect to the free end of mechanical filter 26 that valve member 28, when moved upwardly, closes the passage between supply aperture 17 and the path defined by the space between mechanical filter 26 and cylindrical magnet 20.

A thin L-shaped wiper element 32 is secured at one end to the upwardly facing surface of sludge chamber 22, the free end of the wiper abutting against cylindrical magnet 20. Thus, when the magnet is rotated the wiper will remove the magnetic impurities adhering to the magnet.

As shown in the drawings, mechanical filter 26 is shaped and placed between the inner wall of housing 10 and the outer surface of cylindrical magnet 20 so that the channel between the mechanical filter and housing diverges slightly from supply aperture 17 to discharge aperture 14, while the inner channel between mechanical filter 26 and magnet 20 decreases to a sight extent. However, although the cross sectional areas of each of the two channels changes slightly, the total cross sectional area of flow between the supply and discharge apertures remains constant.

In operation, the fluid (which may be liquid or gas) containing impurities to be separated therefrom is introduced through inlet duct 12 and forced further downwardly by deflecting element 16 to enter the working area of the filter through supply aperture 17. Since the impurities in the fluid will almost always be heavier than the fluid itself, the impurities will immediately tend to sink to the bottom of the fluid stream, forming a relatively heavy layer which travels in the channel between the mechanical filter 26 and magnet 20. The lighter fluid containing fewer impurities will, on the other hand, be forced into the channel between filter 26 and the inner surface of housing 10. During the flow through the filter, the magnetic particles or impurities within the stream will be attracted to magnet 20 and thus separated from the flow of the fluid to be purified. The remaining impurities will sink into the sludge chamber 22 or be trapped by mechanical filter 26 as the fluid stream exits through the outlet duct 14 as shown by the arrows. The lighter stream flowing in the upper channel will also flow through discharge aperture 14.

The construction as so far described provides reliable and trouble free operation, since the fluid flow is maintained at all times thus also maintaining a constant pressure drop across the filter.

To cleanse the cylindrical magnet 20 of the magnetic particles attracted thereto, the handle exterior of the housing 10 is rotated clockwise as shown by arrow 34 whereby wiper element 32 forces these impurities into sludge chamber 14.

To clean mechanical filter 26, magnet 20 is rotated in a clockwise direction so that the magnetic valve member 28 which adheres thereto is rotated upwardly and into an abutting relationship with stop pins 30 to close the channel between mechanical filter 26 and magnet 20. When this occurs, the entire fluid flow is introduced into the channel between filter 26 and housing 10, so that the fluid moves in a direction reverse to the normal operating condition through the mechanical filter to flush the impurities into the sludge chamber 14. The sludge chamber 14 is cleaned by opening the quick opening valve 24 after a sufficient quantity of impurities have been accumulated in the chamber. It is not necessary that the cleaning intervals of the sludge chamber coincide with the cleaning operations of the cylindrical magnet 20 or the mechanical filter 26. In fact, if desired, all three cleansing operations may be accomplished at different times.

Although a preferred embodiment of the invention has been shown and described, the invention should not be limited except as defined in the following claims.

What I claim is:

1. A continuous filter, comprising a housing having formed therein a chamber and having spaced inlet and discharge apertures communicating with said chamber, a portion of said housing forming a deflecting element intermediate said chamber and said inlet aperture, said deflecting element defining a supply aperture with a portion of said chamber, a rotatable magnet disposed within said chamber such that the centermost portion of said magnet is above said supply aperture, the outer portions of said magnet being spaced from walls defining said chamber, a mechanical filter secured to said housing below said discharge aperture such that a major portion of said mechanical filter is spaced from outer portions of said magnet and the walls of said chamber, thereby defining an inner flow path between said mechanical filter and said magnet and an outer flow path between said mechanical filter and upper walls of said chamber and substantially coaxial therewith, said supply aperture forming a fluid entrance to each flow path, said filter extending around a major portion of said magnet, blocking means for selectively closing said inner flow path adjacent said supply aperture, collecting means communicating with said chamber for removing impurities from said magnet and for accumulating said impurities, and removing means cooperating with said collecting means for removing said accumulated impurities from said housing.

2. A continuous filter according to claim 1 wherein said magnet is generally cylindrical in shape and rotatably mounted in said housing, and wherein said collecting means include wiper means for cleaning said magnet.

3. A continuous filter according to claim 2 wherein said blocking means comprises a cylinder made of magnetic material adapted to normally abut against said cylindrical magnet.

4. A continuous filter according to claim 1 wherein said mechanical filter is so shaped and positioned with respect to the rotatable magnet and said housing that the outer flow path between said mechanical filter and the upper walls of said chamber increases in cross-sectional area between the supply aperture and the discharge aperture, while the cross-sectional area of the flow path between the mechanical filter and said magnet decreases by the same amount between said supply and discharge apertures.

References Cited

UNITED STATES PATENTS 3,216,574  11/1965  Lammers _____ 210—223

FOREIGN PATENTS 444,880  8/1912  France.
1,149,845  6/1963  Germany.

REUBEN FRIEDMAN, *Primary Examiner.*

F. W. MEDLEY, *Assistant Examiner.*